(12) United States Patent
Bond et al.

(10) Patent No.: US 9,551,422 B2
(45) Date of Patent: Jan. 24, 2017

(54) GASKET

(75) Inventors: Stephen Peter Bond, Houston, TX (US); Anthony Russell Currie, Duncaster (GB); Stephen Woolfenden, Rochdale (GB); Dean John Kirby, Leeds (GB)

(73) Assignee: Flexitallic Investments, Inc., Kingwood, TX (US)

( * ) Notice: Subject to any disclaimer, the term of this patent is extended or adjusted under 35 U.S.C. 154(b) by 0 days.

(21) Appl. No.: 12/976,097

(22) Filed: Dec. 22, 2010

(65) Prior Publication Data

US 2011/0156352 A1 Jun. 30, 2011
US 2014/0042702 A2 Feb. 13, 2014

(30) Foreign Application Priority Data

Dec. 24, 2009 (GB) .................................. 0922625.9

(51) Int. Cl.
| | | |
|---|---|---|
| F16J 15/00 | (2006.01) | |
| F16J 3/00 | (2006.01) | |
| F16J 15/12 | (2006.01) | |
| F16J 15/06 | (2006.01) | |
| F16L 23/18 | (2006.01) | |

(52) U.S. Cl.
CPC ............. *F16J 15/121* (2013.01); *F16J 15/064* (2013.01); *F16L 23/18* (2013.01)

(58) Field of Classification Search
USPC ............... 277/312, 628, 654, 590, 591, 650, 637, 277/630
See application file for complete search history.

(56) References Cited

U.S. PATENT DOCUMENTS

| | | | |
|---|---|---|---|
| 1,942,704 | A | 1/1934 | Hubbard et al. |
| 2,520,089 | A | 4/1946 | Lippincott |
| 3,108,818 | A | 10/1963 | Furstenburg |
| 4,095,809 | A | 6/1978 | Smith |
| 4,189,819 | A | 2/1980 | Nicholson |
| 4,296,177 | A | 10/1981 | Freundlinger et al. |

(Continued)

FOREIGN PATENT DOCUMENTS

| | | |
|---|---|---|
| DE | 202005006698 | 6/2005 |
| EP | 0013694 | 8/1980 |

(Continued)

OTHER PUBLICATIONS

International Preliminary Report on Patentability and Written Opinion dated Jun. 26, 2012 in related PCT Application PCT/GB2010/052184, 6 pages.

(Continued)

*Primary Examiner* — Kristina Fulton
*Assistant Examiner* — Eugene G Byrd
(74) *Attorney, Agent, or Firm* — Kilpatrick Townsend & Stockton LLP

(57) ABSTRACT

Gaskets for sealing two mating surfaces are described. The gaskets have an outer portion including a core between two sealing layers and an inner portion made of a deformable material and located in an aperature in the outer portion. The thickness of the inner portion is greater than the thickness of the outer portion. The inner portion may include a chemical treatment agent that can provide chemical protection to the mating surfaces. Methods of producing the gaskets and methods of using the gaskets for sealing joints, including corroded joints, are also described.

45 Claims, 3 Drawing Sheets

(56) References Cited

U.S. PATENT DOCUMENTS

| | | | |
|---|---|---|---|
| 4,575,917 | A | 3/1986 | Kana et al. |
| 4,673,187 | A | 6/1987 | Hanson et al. |
| 4,778,189 | A * | 10/1988 | Udagawa ............... 277/648 |
| 4,962,938 | A | 10/1990 | Cooper |
| 5,011,162 | A | 4/1991 | Jelinek |
| 5,145,190 | A | 9/1992 | Boardman |
| 5,222,744 | A | 6/1993 | Dennys |
| 5,421,594 | A * | 6/1995 | Becerra ............... 277/608 |
| 5,472,214 | A | 12/1995 | Wainer et al. |
| 5,511,797 | A * | 4/1996 | Nikirk et al. ............ 277/609 |
| 5,518,257 | A * | 5/1996 | Breaker ............... 277/612 |
| 5,645,284 | A | 7/1997 | Fitton |
| 5,664,791 | A | 9/1997 | Owen |
| 5,823,542 | A | 10/1998 | Owen |
| 5,895,056 | A * | 4/1999 | Habuta et al. .......... 277/598 |
| 5,975,539 | A * | 11/1999 | Ueda et al. ............ 277/593 |
| 6,092,811 | A | 7/2000 | Bojarczuk et al. |
| 6,093,467 | A | 7/2000 | Forry |
| 6,367,803 | B1 * | 4/2002 | Loth ............... 277/321 |
| 6,682,081 | B2 | 1/2004 | Burton et al. |
| 6,845,983 | B1 * | 1/2005 | Suggs et al. ............ 277/314 |
| 6,932,352 | B2 | 8/2005 | Matsumoto et al. |
| 6,948,717 | B1 | 9/2005 | Carr |
| 7,121,556 | B2 | 10/2006 | Barth et al. |
| 7,455,300 | B2 * | 11/2008 | Dudman ............... 277/626 |
| 7,455,301 | B2 | 11/2008 | Ragsdale et al. |
| 7,976,028 | B2 * | 7/2011 | Miyoshi et al. ......... 277/652 |
| 8,066,843 | B2 | 11/2011 | Ragsdale et al. |
| 2003/0230856 | A1 | 12/2003 | Forry et al. |
| 2004/0007828 | A1 * | 1/2004 | Forry et al. ............ 277/592 |
| 2005/0062234 | A1 * | 3/2005 | Kuribayashi ............ 277/602 |
| 2005/0116427 | A1 * | 6/2005 | Seidel et al. ............ 277/610 |
| 2005/0280214 | A1 * | 12/2005 | Richards ............... 277/608 |
| 2007/0262538 | A1 | 11/2007 | Taguchi |
| 2008/0012324 | A1 | 1/2008 | Dole et al. |
| 2012/0235365 | A1 | 9/2012 | Stubblefield |

FOREIGN PATENT DOCUMENTS

| | | |
|---|---|---|
| EP | 0486869 | 5/1992 |
| EP | 1267049 | 12/2002 |
| EP | 1418367 | 5/2004 |
| GB | 1049328 | 11/1966 |
| RU | 2282083 | 8/2006 |

OTHER PUBLICATIONS

International Search Report and Written Opinion dated Apr. 6, 2011 in related International Application No. PCT/GB2010052184.
United Kingdom Search Report dated Oct. 28, 2010 in related Great Britain Application No. GB0922625.9.
European Search Report dated Feb. 26, 1992 in related European Application EP91118846.
European Search Report dated Nov. 5, 2001 in related European Application EP01830379.

* cited by examiner

GASKET

CROSS-REFERENCE TO RELATED APPLICATION

This application claims the benefit of Great Britain Patent Application No. 0922625.9 filed on Dec. 24, 2009, the contents of which are incorporated herein by reference.

FIELD OF THE INVENTION

The present invention relates to gaskets, in particular, but not exclusively, flange joint sealing gaskets with an especially advantageous application as a replacement flange joint sealing gasket.

BACKGROUND

The use of gaskets in sealing applications is commonplace in many industries. A well known application for gaskets is to provide fluid sealing between two mating surfaces such as between two ends of adjoining pipes or conduits where they are commonly in the form of a flange joint for ease of assembly and disassembly and for better sealing. A flange joint sealing gasket usually comprises a compressible ring defining an aperture of a size that matches the conduit being sealed and a body that matches the dimensions of the flange mating surfaces. In many applications however the flange joint mating surfaces which are typically metal eventually become damaged either by internal chemical corrosion, erosion or external weathering. This attrition of the surface can cause pitting, crevices and other imperfections to form on the surface. In such cases, replacement of an ordinary sealing gasket will not be sufficient to effect adequate sealing under operational pressures because the surface imperfections may provide fluid escape pathways and weak points in the surface sealing. As a consequence, it may become necessary to replace or repair the flanges or even the whole flanged pipe to reestablish or improve sealing performance.

In high pressure sealing applications, one preferred gasket has what is known as a Kammprofile core. This is effectively a gasket with a series of concentric serrations or a concertina-like profile on one or both facing surfaces. The profile is superimposed onto a solid core, usually metal, by the series of concentric serrations. During the sealing process the overlying softer sealing material is forced into the gaps between serrations to improve sealing by inducing stress concentrations on the sealing surfaces. The serrations also minimise lateral movement of the facing material, while the metal core provides rigidity and blowout resistance. Such a profile gives the gasket added strength for high pressure applications. As mentioned, such a gasket also includes a suitable compressible sealing material that is coated over the Kammprofile core. However, in cases of mating surfaces which have become pitted or corroded even such high pressure gaskets cannot always provide adequate sealing. It is an object of the present invention to provide an improved gasket suitable for such applications but also having wider applications for corroded or otherwise damaged mating surfaces.

U.S. Pat. No. 6,092,811 relates to a corrugated gasket core that uses inner and outer laminate materials. The inner material is designed to be chemically resistant to protect the outer material from chemical attack. The use of these gaskets to seal parallel mating surfaces including scratched or pitted surfaces is discussed but no mention of including a chemical treatment agent into the material or the possibility of simultaneously chemically protecting the damaged surfaces of the gaskets is mentioned.

Methods of coating the inner edge of a gasket with another sealing material usually a polymer or inorganic sealant are described in U.S. Pat. No. 6,093,467, US 2004/0007828 and US 2003/0230856. The possibility of the polymeric coating being of a greater depth to enhance sealing is disclosed as is the possibility of use with a damaged surface. However, no mention of chemically protecting the mating surfaces is mentioned.

SUMMARY

According to a first aspect of the present invention there is provided a gasket for sealing two mating surfaces having:
a) an outer portion comprising a core interposed between sealing layers, the outer portion defining a first aperture therein, the core and/or the sealing layers defining an inner edge of the outer portion, the said inner edge immediately surrounding the first aperture;
b) an inner portion comprising deformable material defining a second aperture therein, the inner portion having an inner edge defining the second aperture and an outer region designed to be secured to the outer portion so that the inner portion is held securely by the outer portion, the thickness of the inner portion being greater than the thickness of the outer portion so that in use the inner portion deforms to a greater extent than the outer portion, and wherein the deformable inner portion includes a chemical treatment agent operable to provide chemical protection on the surfaces of mating surfaces to be sealed.

The chemical treatment agent may thus be applied to the component mating surfaces to simultaneously treat the surface during sealing.

Preferably, the outer region of the inner portion is defined by the outer edge of the inner portion which is designed to be continuously close fitting with the inner edge of the outer portion.

However, alternatively, the outer region of the inner portion may overlap the inner edge of the outer portion and be secured to the upper and lower surfaces thereof. In such cases, the inner portion may be in the form of a laminate which is applied and secured to both surfaces of the outer portion at the overlapping outer region of the inner portion and is then merged together at least at the inner edges of the inner portion to define the second aperture. In such cases, at least a portion of the outer portion is not so overlapped. In any case, it will be apparent that the second aperture is smaller than and located within the first aperture.

Additionally or alternatively it is possible to secure the inner portion to the outer portion by suitable fixing means. The fixing means may extend from the core to secure the two portions together. For this purpose the fixing means is preferably arranged so that it does not come into contact with the two mating surfaces in use. One possible embodiment for this purpose is to embed the fixing means in the outer and/or inner portion in such a manner that it extends in the plane of the gasket. Typically, the fixing means may be embedded in the outer portion in the sealing layer, between the sealing layer and the core or even in the core and/or it may be embedded in the inner portion. At least the outer region of the inner portion may be designed to accommodate such a fixing means. Preferably, for secure fixation, the fixing means may extend inwardly from the core, preferably, the inner edge thereof, in the plane of the gasket and into the inner portion. The fixing means may be integral with the core and may be co-planar therewith at the axial ends thereof. Preferably, the fixing means is a radially inwardly extending projection from the inner edge of the core. Typically, the radially innermost end of the projection extends part way through the inner ring in the plane of the gasket to thereby secure the inner ring to the outer ring. The accommodating socket for the projection in the inner ring may be formed by the projection or formed separately. Typically, there are at least two such projections, more preferably, at least three, most preferably, at least four. Conveniently, in this embodiment the core and projections may be pressed from the same sheet material for instance by using a punch press and/or by laser cutting.

Preferably, however, the outer portion is in the form of a Kammprofile gasket which provides a solid inner edge defining the first aperture and against which the outer edge of the inner portion can engage to provide a strong abutment in use. Thus the outer portion core may comprise a solid metal core having a series of serrations formed on the facing surfaces thereof. A suitable groove profiler machine may be used to form the serrations on the core.

Preferably, the chemical treatment agent is a corrosion treatment agent, more preferably a rust inhibitor. Typically, the chemical treatment agent is present in the deformable inner portion in a range of 0.01% to 50% w/w, more preferably, 0.1% to 20% w/w, most preferably, 0.5% to 5% w/w.

By chemical protection is meant the provision of chemical agents to prevent chemical attack and this does not include providing physical protection against chemical attack such as by sealing of the mating surface to prevent ingress of fluid.

It will be clear from the foregoing that the chemical treatment agent will be in contact with at least one and preferably both mating surfaces in use. Accordingly, the chemical treatment agent is included in such a manner that it is available on the surfaces of the inner portion material that will be in contact with the mating surfaces in use. Preferably, it is available on the majority, more preferably, substantially all of the surface of the inner portion that will be in contact with the mating surfaces in use.

Preferably, the material of the inner portion is more compressible than the sealing layer of the outer portion. Suitable sealing materials for the outer portion include PTFE, graphite, Thermiculite (or suitable vermiculite based sealing material), non-asbestos sheet, or a soft metallic face such as silver or tin, preferably, PTFE is used. The PTFE is preferably biaxially orientated. In particular, the biaxially orientated PTFE is preferably filled with hollow glass microspheres. Such a material is available from Flexitallic under trade name Sigma 500.

Biaxially orientated PTFE containing hollow glass microspheres has advantages over pure or filled PTFE and envelope gaskets by reducing cold flow.

Biaxially orientated PTFE is generally produced by producing a slurry of PTFE particles in a volatile solvent, optionally with fillers, dyes and/or other suitable gasket additives such as the glass microsheres mentioned above. After draining, a sheet of pliable mass is formed which is rolled in two different mutually perpendicular directions to cause the PTFE particles to fibrillate and create a network of biaxially orientated fibres in two different directions, generally at right angles to each other. The technique is well known to the skilled person and was originally developed by Du Pont and is disclosed in GB 1,049,328.

Suitable non asbestos sheets are generally made by compressing and alendaring synthetic fibre, natural rubber, a suitable gasket filler and optionally, a dye. Suitable fillers will be known to the skilled person and may be selected from: talc, clay, calcium carbonate, silica etc Suitable synthetic fibres will be known to the skilled person and may be selected from: aramid, glass fibres, mineral fibres and carbon fibres.

By "soft" metallic face is meant a metal having a hardness less than 3.0 or less than copper on the Mohr hardness scale.

Suitable sealing materials for the inner portion include PTFE, wherein this PTFE is preferably softer than the PTFE of the outer part, when used, more preferably a highly compressible biaxially orientated microcellular PTFE based material.

As mentioned above the inner portion is preferably more compressible than the outer portion so that in use the inner material is only compressed as far as the less compressible outer portion will allow.

The compression of the respective sealing materials may be measured by ASTM F36. Preferably, the compression of the outer portion falls within the range 5-50% compression, more preferably, 10-40%, most preferably, 20-30% compression, in use. In any case, the outer portion will typically have less than 50% compression, more preferably <40% compression, most preferably, <30% compression with reference to the original thickness.

Typically, the compression of the inner portion is within the range 30-90% compression in use, more typically, 40-80%, most typically, between 50-70% compression. In any case, the inner portion will typically have more than 30% compression, more typically, more than 40% compression and most typically more than 50% compression in use. In any case, the inner portion compression is preferably greater than the outer portion.

Suitable sealing materials for the inner portion include those having the above compression characteristics, particularly those which are relatively chemically inert. A suitable material is a microcellular biaxially oriented PTFE which has been produced with a water soluble filler that can be washed out after sintering of the PTFE material to produce a hollow microcellular structure. Such a production technique is known to the skilled person. Such a material can then be washed with a solution of the chemical treatment agent followed by drying to thereby impregnate the microcellular structure of the PTFE material. Repeated washing and drying steps or variation in the solution concentration can be used to effect the required concentration in the final gasket effective to produce an improvement to the flange joints in the final application. A material suitable for such impregnation is available from Flexitallic under trade name Sigma 600.

Preferably, the inner portion deformable material is inherently more compressible than the sealing layer material, typically, at least 10% more compressible, more typically, at least 20% more compressible, most typically, at least 50% more compressible in the axial direction under normal operating pressures.

Advantageously, the material of the inner portion allows it to be compressed into any imperfections in the mating surface thus at least partially filling any scratches, crevices or pits in the surface. By this means, a very efficient delivery mechanism to the surface imperfections for the chemical treatment agent is achieved at the same time as the surface imperfections are sealed from further attack by the inner portion deformable material. Thus a separate chemical treatment coating step for the mating surface is not required. By impregnating the material of the inner portion with a chemical treatment agent such as a rust inhibitor, further corrosion of the damaged areas is reduced by specifically applying rust inhibitor into scratches, crevices and pits using the compressibility of the inner portion as the delivery agent. Still further, the inner material has the effect of micro-sealing the imperfections in the mating surfaces by forming a seal around the edge of the surface imperfection with the rest of the mating surface thus sealing the imperfection in with the impregnated surface of the inner portion material.

According to a further aspect of the present invention there is provided a method of sealing two substantially parallel surfaces, comprising:

interposing between the said surfaces a gasket according to the first aspect of the present invention;

positioning said gasket between the two substantially parallel surfaces; and securing said parallel surfaces together to thereby deform the inner portion of the gasket against the said parallel surfaces.

According to a further aspect of the present invention there is provided a method of sealing and simultaneously coating/treating mating surfaces with a gasket comprising the steps of locating a gasket according to the first aspect of the present invention on the mating surface to be sealed and securing the gasket in position so that the inner ring is compressed and the chemical treatment agent is delivered to the mating surfaces.

Preferably, the mating surfaces have been damaged by corrosion.

A method of producing a gasket according to the first aspect of the present invention comprising:

providing a core according to the first aspect of the present invention, coating the core on upper and lower faces with a core sealing layer to provide an outer portion according to the first aspect of the present invention and locating a close fitting inner portion according to the first aspect of the present invention around the inner edge of the outer portion.

Preferably, the inner portion material can be compressed to between 10-90% of its original thickness under normal operating pressures, more preferably, it may be compressed to 20-85% of its original thickness under such pressures, most preferably, it may be compressed to between 50-75% of its original thickness.

Generally, the inner portion material is a core free material and typically, the deformable material including the treatment agent forms the entire inner portion. However, in an alternative embodiment it may overlap with the core of the outer portion as mentioned above.

By normal operating pressures is meant between 100 Kpa-43000 Kpa, more typically, 1000 Kpa-20000 Kpa. As mentioned above, the inner portion outer edge is preferably designed for close fitting engagement with the inner edge of the outer portion, typically, this is provided by a push fit arrangement which is usually satisfactory because of the resiliently deformable nature of the inner portion which allows it to be compressed sufficiently to provide a sufficiently strong seal at the junction of the inner and outer portion.

For most flange gasket applications with ring shaped flanges both the inner portion and the outer portion are also in the form of rings. Typically, the outer edge of the outer portion is designed to be coextensive with the flange outer edge. However, in some embodiments, the outer edge may be defined by the mating surfaces and the outer portion of the flange may extend further to accommodate fixing components such as bolts etc. In a still further embodiment, however, the gasket may be designed to accommodate such fixings through the body of the gasket too.

In a still further embodiment, the gasket may include an outwardly extending extension to the gasket to allow the gasket to be held by the fitter whilst being secured in position in a joint. Generally, the extension does not form part of the gasket unlike lugs found on some gaskets having apertures for joint fixation devices such as bolts to pass therethrough and thereby secure both the gasket and the faces of the joint. In fact, in a preferred embodiment, the extension is secured to such a fixation lug which itself extends integrally from the outer core of the gasket. Once the gasket is secured in position the extension which is located outside the joint may be removed. Accordingly, the extension is preferably frangible for this purpose. However, any suitable attachment means for the extension may be utilised as long as it can be removed after the gasket is secured in position in the joint. A suitable embodiment includes a generally co-planar T-shaped extension secured at its base to the outer edge of the outer portion or, optionally, a fixation lug by one or more frangible thin sections. The thin sections are strong enough to keep the extension attached to the main gasket during normal storage, transport and fitting conditions but weak enough to allow easy removal under a suitable force applied by the user after joint fixation. The handle extension also provides a convenient means to locate the gasket in the correct position in the joint. This can be particularly advantageous in subsea locations where the maintenance diver needs to avoid entrapment in the event of unexpected joint closures. For storage and transport reasons, the extension is generally co-planar with the main gasket body but it may also be advantageous for the extension to extend from the outer portion at a small angle to the plane of the gasket of about 1 to 60°, more preferably, 1 to 30°.

In one embodiment, the extension is secured to the core, optionally via a fixation lug, and preferably consists of the same material. This allows the core and extension to be cut or punched therefrom as a single piece.

Preferably, the core of the present invention is designed to be suitable for the operating pressures under which the gasket will be used. A particularly advantageous core design is one having serrated ridges or a concertina-like profile on the facing surfaces of a solid metal core. Such gaskets cores are well known in the art of gaskets and are described as Kammprofile gaskets.

Suitable materials for the core are stainless steel, alloy 400, other suitable Monel alloys, carbon steel or other suitable metal to match the parallel surfaces to be sealed.

It will be appreciated that although one particularly useful application of the present invention is in the field of flange gaskets which have become corroded due to exposure to sea water, the invention has other applications generally in the field of gaskets where two metal surfaces are mated together and one or both of the surfaces has become corroded or otherwise pitted or damaged by chemical attack. Clearly, the chemical treatment agent is selected to fill and simultaneously treat the damaged areas. For instance, a flange that was subject to acid attack may require a neutralising agent or buffer that might resist the acid attack. Similarly, caustic attack can be treated with a corresponding neutralising agent or an alkali buffer. Further applications may include surfaces exposed to oxidising or reducing agents and the corresponding chemical agents can be selected accordingly.

Advantageously, even if the gasket of the invention is not impregnated with a chemical treatment agent but the mating surfaces have become corroded to the extent that normal gaskets allow unacceptable leakage, a gasket according to the invention can improve the leakage characteristics of the joint. This is brought about by the greater thickness and hence deformation of the inner portion assisting the sealing of the corroded surface. Thus by use of the device of the present invention extended joint life can be achieved, particularly in corroding environments.

Thus according to a further aspect of the present invention there is provided a gasket for sealing two mating surfaces having:

a) an outer portion comprising a core interposed between sealing layers, the outer portion defining a first aperture therein, the core and/or the sealing layers defining an inner edge of the outer portion, the said inner edge immediately surrounding the first aperture;

b) an inner portion comprising deformable material defining a second aperture therein, the inner portion having an inner edge defining the second aperture and an outer region designed to be secured to the outer portion so that the inner portion is held securely by the outer portion, the thickness of the inner portion being greater than the thickness of the outer portion so that in use the inner portion deforms to a greater extent than the outer portion.

Preferably, the deformable inner portion includes a chemical treatment agent operable to provide chemical protection on the surfaces of mating surfaces to be sealed. In addition, the gasket of this aspect may include any one or more of the optional, preferred or typical features of the gaskets of other aspects Therefore, the invention also extends to a method of sealing two substantially parallel surfaces, comprising:

interposing between the said surfaces a gasket according to this further aspect;

positioning said gasket between the two substantially parallel surfaces; and securing said parallel surfaces together to thereby deform the inner portion of the gasket against the said parallel surfaces. Preferably, at least one of the parallel surfaces has been corroded to such an extent that significant leakage occurs if a normal gasket, for example, one consisting of only an outer portion according to part (a) of this aspect of the invention but defining the second aperture therein rather than the first aperture, is secured between the said parallel surfaces.

Additionally, the invention extends to a method of producing a gasket according to this aspect of the present invention comprising:

providing a core according to this aspect of the present invention, coating the core on upper and lower faces with a core sealing layer to provide an outer portion according to this aspect of the present invention and locating a close fitting inner portion according to this aspect of the present invention around the inner edge of the outer portion.

Furthermore, the invention extends to the use of a gasket according to this aspect as a sealing gasket for corroded parallel surfaces, typically joints, especially, flange joints, In accordance with any aspect of the invention a preferred material for the sealing coating on the core material and the inner deformable material is biaxially structured PTFE. Typically, the inner material has a microcellular structure and is impregnated with the selected chemical agent such as corrosion inhibitor.

Impregnation of the inner portion material may be carried out by dipping, spraying, brush coating or any suitable technique known in the coating art. The inner portion material may be coated prior to being cut into the required gasket shape.

A suitable rust inhibitor for the present invention may be selected from the list consisting of: suitable salts of phosphates, molybdates, nitrites, borates, phosphonates or other iron chelating or sequestering agents. Typical chelating agents include EDTA (ethylenediamine tetraacetic acid), HEDTA (hydroxyethylenediamine triacetic acid), NTA (nitriolotriacetic acid) and citric acid. Preferably, a metal salt of EDTA is selected such as an alkali, alkaline earth metal salt, most preferably a sodium EDTA salt. An aqueous solution of an EDTA salt may be used to apply the EDTA salt. A suitable concentration thereof will depend on the application but a typical range will be 1-10000 $g/m^3$, more typically, 10-5000 $g/m^3$, most typically, 200-2000 $g/m^3$.

Preferably, the inner portion material compressibility is selected so as to cause it to make intimate contact in the crevices and other corrosion based defects in a flange surface, the benefit of this is firstly that it will make a good seal which is important for a gasket, but secondly where there is a corrosion cell it can passivate the cell by allowing the EDTA (or other) anion to react with iron (in the crevice on the flange surface), thus cutting off the corrosion reaction. Also, in the presence of water (and the potential beginning of a corrosion cell) the anion can be released and react with any iron available on the flange surface, passivating it, and thus making it more difficult for a corrosion cell to initiate.

The invention will now be described by way of illustration only with reference to the accompanying drawing.

DETAILED DESCRIPTION

Figure 1:
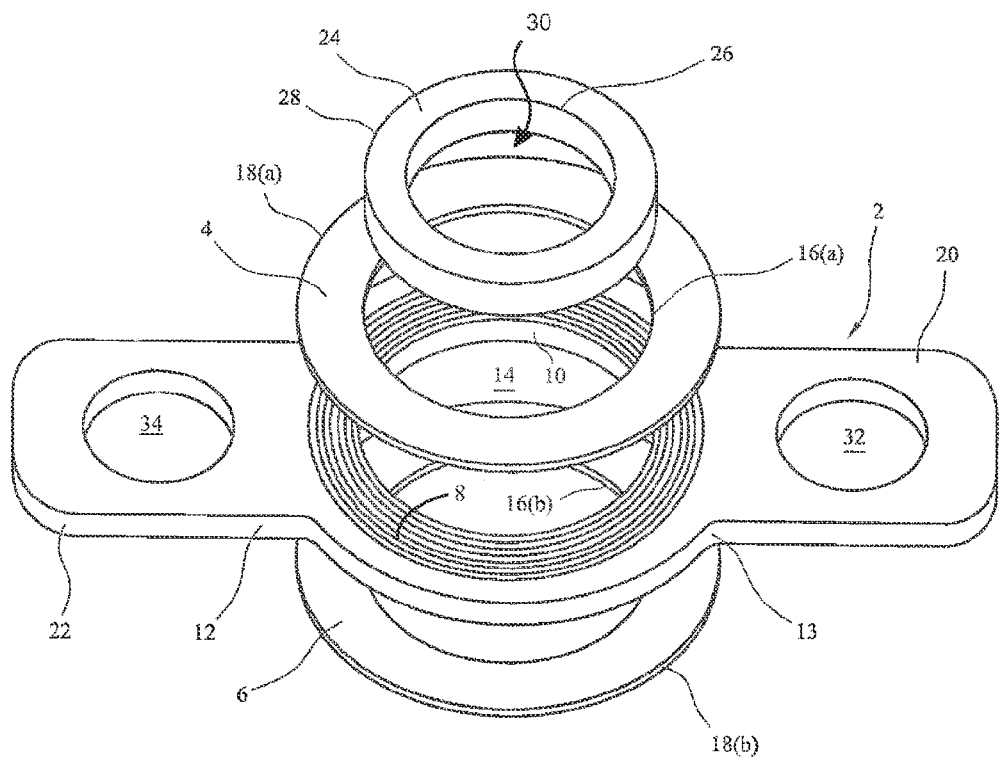
FIG. 1 is An exploded perspective view of a gasket of the present invention showing the separate components.
Figure 2:
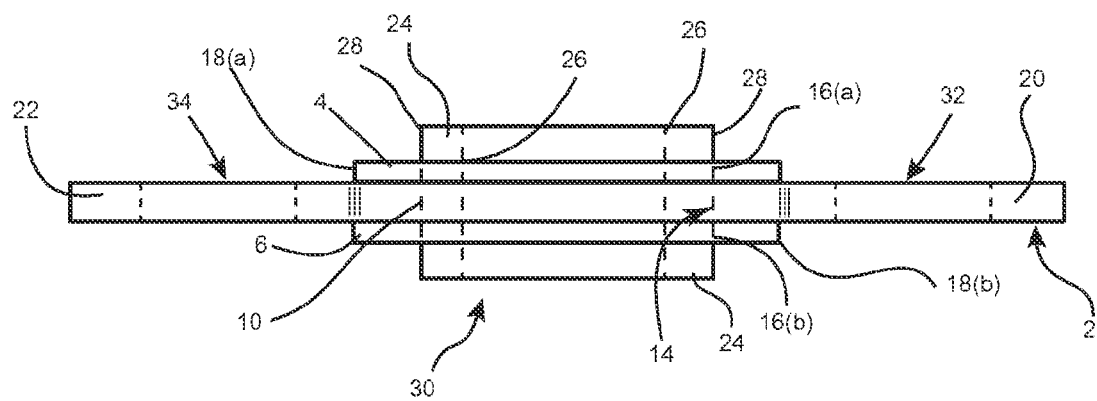
FIG. 2 is a side view of the assembled form of the gasket shown in FIG. 1.

Referring to FIGS. 1 and 2, a corrugated gasket core 2 is shown having a corrugated area 8 extending outwardly from an inner edge 10 defining a first aperture 14 to a plane surfaced outer area 12. FIG. 1 shows the core 2 prior to complete covering of the upper and lower surface of the corrugated area 8 with respective PTFE sealing rings 4, 6 having inner edges 16a, 16b which also define the first aperture 14 and outer edges 18(a), 18(b) which terminate at the outer edge of the corrugated area 8 when affixed to the surface of the core. FIG. 2 shows a side view of the assembled gasket. The core 2 includes handling lugs 20, 22 extending outwardly from the plane surface area 12 on opposite sides of the gasket core. Each lug 20, 22 is integral with the core and has a centrally disposed hole 32, 34 to accommodate a fixing bolt (not shown) when locating the gasket in the flange joint.

The gasket includes an inner ring 24 defined by an inner edge 26 which itself defines a $2^{nd}$ aperture 30 and an outer edge 28 which is shaped for close fitting engagement with the inner edges of the gasket core 10 and outer sealing rings 16(a) and 16(b). The axial depth of the inner ring 24 is roughly twice that of the assembled outer ring and it is located in such a manner that it extends beyond the surface of the outer ring equally in both axial directions.

Figure 3:
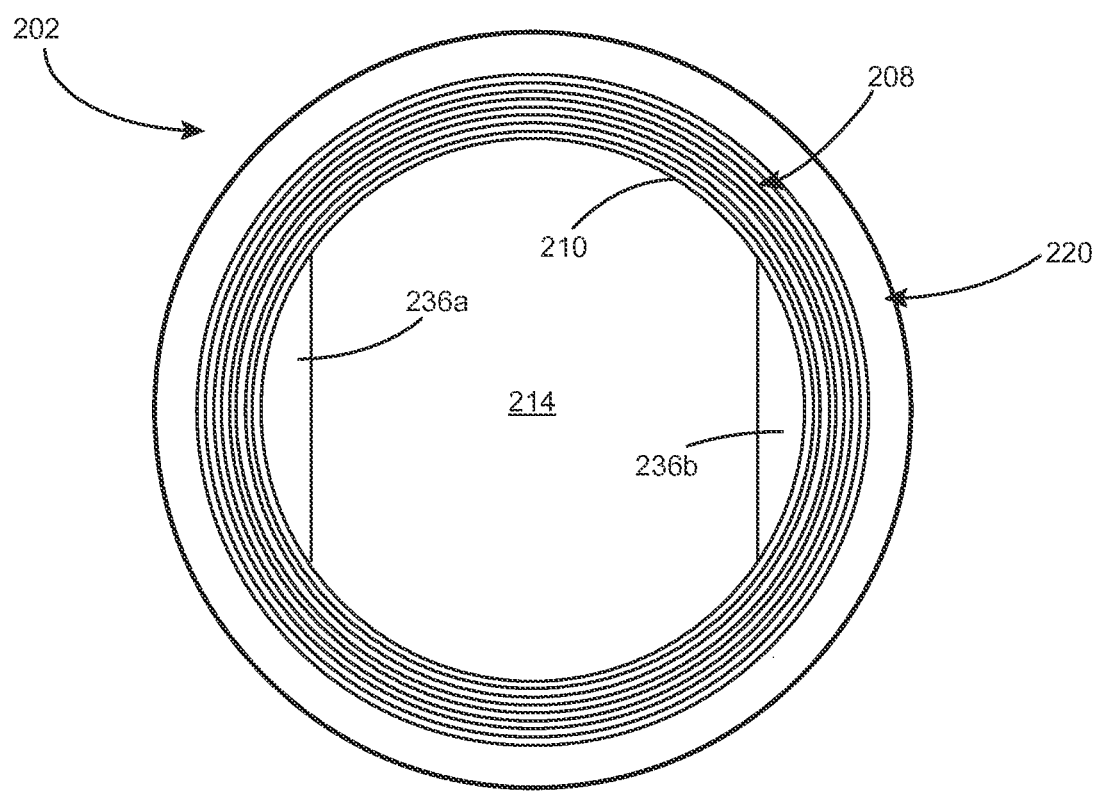
FIG. 3 is a top view of a core portion of a gasket of the present invention having two projections.

Referring to FIG. 3, a corrugated gasket core 202 is shown having a corrugated area 208 extending outwardly from an inner edge 210 defining an aperture 214 to a plane surfaced outer area 220. FIG. 3 shows the core without any sealing material covering the corrugated area and without a deformable inner portion. FIG. 3 shows two projections 236a, 236b extending radially inwardly from the inner edge 210 of the core 202. The projections are used to secure the core 202 to a deformable inner portion (not shown).

Figure 4:
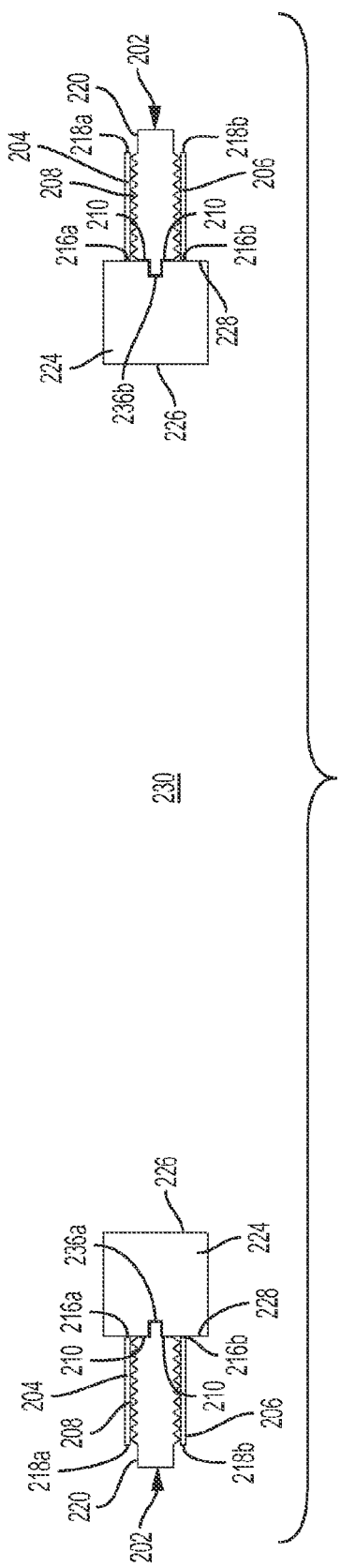
FIG. 4 is a cross-sectional view of a gasket of the present invention having two projections.

Referring to FIG. 4, a cross-section of a gasket is shown. The gasket has a corrugated core 202 similar to that shown in FIG. 3, and a corrugated area 208 extending outwardly from an inner edge 210 to a plane surfaced outer area 220. The core 202 is shown completely covered on the upper and lower surfaces of the corrugated area 208 with sealing material 204, 206 having inner edges 216a, 216b and outer edges 218a, 218b which may terminate at the outer edge of the corrugated area 208. The gasket includes an inner ring 224 defined by an inner edge 226, which itself defines an aperture 230 and an outer edge 228 adjacent to inner edges 216a, 216b, and 210. FIG. 4 shows two projections 236a, 236b extending radially inwardly from the inner edge 210 of the core 202. The projections 236a, 236b are used to secure the core 202 to a deformable inner portion 224.

In one embodiment, the inner ring 24 is made of expanded PTFE polymer which is microcellular in structure and which has been fully immersed in a rust inhibiting aqueous solution of sodium EDTA having a concentration of 200 g/m$^3$.

In a further embodiment (not shown), the core includes four equally circumferentially spaced, radially inwardly extending projections, integral with the core and co-planar therewith at the axial ends thereof. The radially innermost end of the projection extends part way through the inner ring in the plane of the gasket to thereby secure the inner ring to the outer ring. The inner rings includes four matching circumferentially spaced sockets to accommodate each of the four projections in the inner ring.

In a still further embodiment (not shown), one of the lugs 20,22 includes a generally co-planar T-shaped extension secured at its base to the radially outermost edge of the lug by one or more frangible thin sections. The thin sections are strong enough to keep the extension attached to the main gasket during normal storage, transport and fitting conditions but weak enough to allow easy removal under a suitable generally axial force applied by the user after joint fixation.

In use, in one embodiment, the gasket is located between two mating parallel surfaces of a flange connection on a pipe connection wherein the surfaces of the flange have been corroded by prolonged exposure to sea water. As the mating surfaces are pressed together the deformable PTFE polymer of the inner is compressed and pushes into the crevices, scratches and pits in the surface of the flange providing sealing thereof and also delivering the sodium EDTA to the corroded areas. At the same time, the PTFE inner ring is also sealed against the undamaged areas on the surface and simultaneously treats those surfaces with rust inhibitor providing future resistance to rusting.

In one embodiment, the gasket is produced by cutting the appropriate gasket shape of the solid stainless steel core and machining a series of concentric serrations of increasing radii from the inner edge thereof which defines a first central aperture. The serrations are terminated before reaching the outer edge of the solid steel core so that an outer border of non-serrated profile is provided on the gasket. An annular ring of PTFE biaxially orientated compressible sealing material sized so as to fit over the serrated ring portion of the gasket is then cut and a suitable adhesive is applied to the inner face thereof. An annular ring of Sigma 500 PTFE is applied to both serrated areas on opposite faces of the core to thereby provide the outer gasket. An inner ring of highly compressible biaxially orientated PTFE, produced by impregnating a suitable sample of Sigma 600 available from Flexitallic with a rust inhibiting aqueous solution of sodium EDTA having a concentration of 200 g/m$^3$ followed by drying is then cut having an outer edge of the same radius as the inner edge of the core and an inner edge which defines the $2^{nd}$ aperture. Typically, the depth of the inner ring material is approximately twice that of the outer ring. In one embodiment, the depth of the inner ring is 6.5 mm and the depth of the outer ring is 3.5 mm made up of a 2 mm thick core and two facing layers each of 0.75 mm thickness. The depth of the serrations on the core is typically about 300 to 400 microns. For larger nominal pipe size flanges, or where out of flatness issues exist, the usage of thicker inner rings may be beneficial up to and including 10 mm. For certain flanges, the usage of a thicker core may also be advantageous.

In one embodiment, the metallic core is serrated in the area of application of the Sigma 500 material; in all other external areas outside the sealing contact areas the metallic core is protected and covered by a layer of Fluoro Polymer (FP) based coating this can optionally include the inner and outer edges of the metallic core. The sealing faces should be masked during coating to avoid contamination thereof. Generally, the FP coating is applied before the sealing layer. This FP offers additional environmental protections and, by use of a distinctive colour, clear visibility on gasket installation when in usage. Advantageously, the covering of the outer edges by the FP polymer allows the user to see which flanges contain this gasket, and which flanges do not without opening the flange.

In one embodiment, the FP applied is IP9286 Red available from, for example, Indestructible Paint Ltd.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A gasket for sealing two mating surfaces comprising:
   a) an outer portion having an upper surface, a lower surface, and an innermost edge located between the upper and lower surfaces, wherein the outer portion comprises (i) a core and
(ii) two sealing layers,
wherein the core is between and adjacent to the two sealing layers,
wherein one or both of the core and the sealing layers define the innermost edge of the outer portion, and
wherein the innermost edge defines a first aperture in the outer portion;
b) an inner portion comprising:
(i) a deformable material;
(ii) an innermost edge defining a second aperture; and
(iii) an outermost region secured to the innermost edge of the outer portion wherein the outermost region of the inner portion is in continuous contact with the innermost edge of the outer portion proximate the upper surface of the outer portion and in continuous contact with the innermost edge of the outer portion proximate the lower surface of the outer portion,
wherein the inner portion is located within the first aperture,
wherein a thickness of the inner portion is greater than a thickness of the outer portion.

2. The gasket of claim 1, wherein the inner portion further comprises a chemical treatment agent.

3. The gasket of claim 1, wherein the core comprises solid metal and includes a series of serrations formed on facing surfaces thereof.

4. The gasket of claim 2, wherein the chemical treatment agent comprises a corrosion treatment agent.

5. The gasket of claim 4, wherein the chemical treatment agent is present in the deformable material in a range of 0.01% to 50% w/w of the inner portion.

6. The gasket of claim 1, wherein the deformable material is more compressible than the sealing layers.

7. The gasket of claim 1, wherein the sealing layers comprise a material selected from the group consisting of PTFE, graphite, vermiculite based sealing material, non-asbestos sheet, and a soft metallic face.

8. The gasket of claim 7, wherein the sealing layers comprise biaxially orientated PTFE.

9. The gasket of claim 1, wherein the deformable material comprises microcellular PTFE.

10. The gasket of claim 9, wherein the PTFE comprises biaxially orientated microcellular PTFE.

11. The gasket of claim 2, wherein the deformable material comprises a microcellular structure and is impregnated with the chemical treatment agent.

12. The gasket of claim 2, wherein the chemical treatment agent comprises a rust inhibitor.

13. The gasket of claim 12, wherein the rust inhibitor is selected from the group consisting of salts of phosphates, molybdates, nitrites, borates, phosphonates, iron chelating agents and sequestering agents.

14. The gasket of claim 1, further comprising a handle extension for use in positioning the gasket.

15. The gasket of claim 14, wherein the extension is removable from the gasket.

16. The gasket of claim 1, further comprising at least one coplanar projection extending from the innermost edge of the outer portion into the inner portion.

17. The gasket of claim 1, wherein the outer portion is less flexible than the inner portion.

18. The gasket of claim 1, wherein the thickness of the inner portion is greater than the thickness of the outer portion so that in use the inner portion deforms to a greater extent than the outer portion.

19. A gasket comprising
(a) an outer portion having an upper surface, a lower surface, and innermost edge located between the upper and lower surfaces, wherein the outer portion comprises
(i) a core having top and bottom surfaces, and
(ii) a sealing material adjacent to one or both of the top and bottom surfaces of the core;
wherein the an innermost edge of the outer portion is defined by the core or the sealing material, and
(b) an inner portion comprising a deformable material and comprising
(i) an outermost edge secured to the innermost edge of the outer portion,
wherein the outermost edge of the inner portion is in continuous contact with the innermost edge of the outer portion proximate the upper surface of the outer portion and in continuous contact with the innermost edge of the outer portion proximate the lower surface of the outer portion; and
(ii) an innermost edge, wherein the innermost edge defines an aperture;
wherein the inner portion has a thickness greater than a thickness of the outer portion.

20. The gasket of claim 19, wherein the outermost edge of the inner portion is continuously close fitting with the innermost edge of the outer portion.

21. The gasket of claim 19, wherein the outermost edge of the inner portion overlaps the innermost edge of the outer portion.

22. The gasket of claim 19, wherein the inner portion is secured to the outer portion.

23. The gasket of claim 22, further comprising at least one fixing component to secure the outer portion to the inner portion.

24. The gasket of claim 23, wherein the fixing component is at least one projection that extends from the innermost edge of the outer portion into the inner portion thereby securing the inner portion to the outer portion.

25. The gasket of claim 19, wherein the inner portion further comprises a chemical treatment agent.

26. The gasket of claim 25, wherein the chemical treatment agent comprises a corrosion inhibitor.

27. The gasket of claim 25, wherein the chemical treatment agent comprises a rust inhibitor.

28. The gasket of claim 27, wherein the rust inhibitor is selected from the group consisting of salts of phosphates, molybdates, nitrates, borates, phosphonates, iron chelating agents and sequestering agents.

29. The gasket of claim 25, wherein the chemical treatment agent is present in an amount of from 0.01% to 50% by weight of the inner portion.

30. The gasket of claim 19, wherein the sealing material is selected from the group consisting of PTFE, graphite, vermiculite based sealing material, non-asbestos sheet, and soft metallic face.

31. The gasket of claim 30, wherein the sealing material is biaxially oriented PTFE.

32. The gasket of claim 19, wherein the deformable material comprises microcellular PTFE.

33. The gasket of claim 32, wherein the PTFE comprises biaxially oriented microcellular PTFE.

34. The gasket of claim 19, wherein the inner portion is more compressible than the sealing material.

35. The gasket of claim 19, further comprising serrations on one or both of the top surface and the bottom surface of the core and surrounding the first aperture.

36. The gasket of claim 19, further comprising a handle extension for use in positioning the gasket, wherein the handle extension is removably attached to the outer portion of the gasket and configured to extend outside a surface to be sealed.

37. The gasket of claim 1, wherein the inner portion has a compressibility of 30-90%.

38. The gasket of claim 19, wherein the inner portion has a compressibility of 30-90%.

39. The gasket of claim 1, wherein both the core and sealing layers define the inner edge of the outer portion.

40. The gasket of claim 1, wherein the core has a first inside radius and each of the two sealing layers has a second inside radius, the first inside radius and second inside radius being substantially the same length.

41. A gasket comprising
   (a) an outer portion having an upper surface, a lower surface, and innermost edge located between the upper and lower surfaces, wherein the outer portion comprises
      (i) a core having top and bottom surfaces comprising a series of serrations, and
      (ii) a sealing material adjacent to one or both of the top and bottom surfaces and overlaying the serrations;
   wherein the innermost edge of the outer portion is defined by the core and/or the sealing material;
   (b) an inner portion comprising a deformable material and comprising
      (i) an outermost edge secured to the innermost edge of the outer portion, wherein the outermost edge of the inner portion is in contact with the innermost edge of the outer portion proximate the upper surface of the outer portion and in contact with the innermost edge of the outer portion proximate the lower surface of the outer portion, and
      (ii) an innermost edge, wherein the innermost edge defines an aperture,
   wherein the inner portion has a thickness greater than a thickness of the outer portion; and
   (c) at least one projection extending from the innermost edge of the outer portion into the inner portion.

42. The gasket of claim 1, wherein the innermost edge connects the upper surface and lower surface.

43. The gasket of claim 1, wherein the core defines the innermost edge of the outer portion.

44. The gasket of claim 1, wherein both the core and the sealing layers define the innermost edge of the outer portion.

45. The gasket of claim 19, wherein the innermost edge of the outer portion is defined by the core.

* * * * *